US011040829B2

(12) United States Patent
Skanse

(10) Patent No.: US 11,040,829 B2
(45) Date of Patent: Jun. 22, 2021

(54) PIVOTABLE DRIVE CONVEYOR SYSTEM

(71) Applicant: INTELLIGRATED HEADQUARTERS, LLC, Mason, OH (US)

(72) Inventor: Randolph T. Skanse, Mason, OH (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 0 days.

(21) Appl. No.: 16/528,904

(22) Filed: Aug. 1, 2019

(65) Prior Publication Data
US 2021/0032037 A1  Feb. 4, 2021

(51) Int. Cl.
*B65G 13/07* (2006.01)
*B65G 47/22* (2006.01)
*B65G 41/00* (2006.01)

(52) U.S. Cl.
CPC .................... *B65G 13/07* (2013.01)

(58) Field of Classification Search
None
See application file for complete search history.

(56) References Cited

U.S. PATENT DOCUMENTS

| | | | | |
|---|---|---|---|---|
| 4,088,224 A | * | 5/1978 | Kittredge | B65G 13/07 198/783 |
| 4,284,190 A | * | 8/1981 | Greenlee, III | B65G 47/261 198/783 |
| 4,308,946 A | * | 1/1982 | Ouellette | B65G 13/07 198/790 |
| 5,348,139 A | * | 9/1994 | Szarkowski | B65G 47/261 198/781.05 |
| 6,899,219 B2 | * | 5/2005 | Cotter | B65G 13/07 198/781.03 |
| 7,191,895 B2 | * | 3/2007 | Zeitler | B65G 43/08 198/460.1 |
| 7,344,018 B2 | | 3/2008 | Costanzo et al. | |
| 7,607,530 B2 | * | 10/2009 | Ueno | B65G 47/5109 193/35 A |
| 8,109,384 B2 | * | 2/2012 | Pressler | B65G 47/8823 198/779 |
| 8,757,363 B2 | * | 6/2014 | Combs | B65G 43/10 198/781.01 |
| 9,266,676 B2 | * | 2/2016 | Pfeiffer | B65G 13/071 |
| 2007/0119690 A1 | | 5/2007 | Lupton | |
| 2007/0261941 A1 | | 11/2007 | Pelak et al. | |
| 2008/0023302 A1 | | 1/2008 | Groom | |
| 2013/0213768 A1 | * | 8/2013 | Yokoya | B65G 43/10 198/462.1 |

\* cited by examiner

*Primary Examiner* — Kavel Singh
(74) *Attorney, Agent, or Firm* — Alston & Bird LLP

(57) ABSTRACT

A conveyor bed including a conveyor frame, a first set of rollers, a second set of rollers, and a pivotable frame is provided. The first set of rollers are coupled to the conveyor frame to transport an article from an upstream location to a downstream location. The pivotable frame pivotably coupled to a side of the of the conveyor frame. The second set of rollers mounted to the pivotable frame, positioned below the first set of rollers. A belt wrapped is around the second set of rollers, and selectively engages and disengages the first set of rollers in response to pivoting the pivotable frame based on predefined criteria.

18 Claims, 8 Drawing Sheets

PIVOTABLE DRIVE CONVEYOR SYSTEM

TECHNOLOGICAL FIELD

Example embodiments of the present invention relates generally to a conveyor system for handling articles, and, more particularly, to a conveyor system with a pivotable frame.

BACKGROUND

Conventional conveyor systems and assemblies may include a conveyor bed and multiple conveyor carriers in the form of conveyor rollers or belts supported on a conveyor frame of the conveyor bed. The multiple conveyor carriers are often used for supporting and transporting objects in industrial and manufacturing contexts. An example conveyor system or assembly may include a sorter conveyor system, a merge conveyor system, an accumulation conveyor system, an induction conveyor system, or the like. These conveyor assemblies are often divided into zones. Each zone may include a set of motorized and non-motorized conveyor rollers with each conveyor roller having an axle coupled to the conveyor frame. The set of motorized conveyor rollers are often configured to accumulate articles on each zone, to move articles in the direction of travel, or to discharge articles into neighboring zones or discharge stations.

SUMMARY

The following presents a simplified summary to provide a basic understanding of some aspects of the disclosed material handling system. This summary is not an extensive overview and is intended to neither identify key or critical elements nor delineate the scope of such elements. Its purpose is to present some concepts of the described features in a simplified form as a prelude to the more detailed description that is presented later.

Various example embodiments described herein, relates to a conveyor bed including a conveyor frame, a first set of rollers, a second set of rollers, and a pivotable frame is provided. The first set of rollers are coupled to the conveyor frame to transport an article from an upstream location to a downstream location. The pivotable frame pivotably coupled to a side of the of the conveyor frame. The second set of rollers mounted to the pivotable frame, positioned below the first set of rollers. A belt wrapped is around the second set of rollers, and selectively engages and disengages the first set of rollers in response to pivoting the pivotable frame based on predefined criteria.

Various example embodiments described herein, relates to conveyor bed including an actuator coupled to the pivotable frame at an upstream end of the conveyor bed to pivot the pivotable frame, wherein the actuator is one of an electric actuator or a pneumatic actuator.

Various example embodiments described herein, relates to conveyor bed with a roller of the second set of rollers being a motorized drive roller (MDR).

Various example embodiments described herein, relates to conveyor bed with a roller of the first set of rollers being an idler roller.

Various example embodiments described herein, relates to conveyor bed including the belt which drives the first set of rollers when the belt is engaged with the first set of rollers, wherein the belt is in a driven state when the pivotable frame is in a home position.

Various example embodiments described herein, relates to conveyor bed including the belt which is disengaged in response to the pivoting the pivotable frame downwards to a work position, a portion of the belt at a pivoting end of the pivotable frame is in contact with the first set of rollers to retard a rotation of a downstream roller of the first set of rollers, and wherein the belt is in a non-driven state in the work position.

Various example embodiments described herein, relates to conveyor bed in which the article coasts to a stop when the belt is in the work position.

Various example embodiments described herein, relates to operating a conveyor bed based on the predefined criteria which comprises an indication of a length of the article entering onto an upstream end of the conveyor bed.

Various example embodiments described herein, relates to operating a conveyor bed based on the predefined criteria which comprises an indication of an empty space on the conveyor bed.

Various example embodiments described herein, relates to operating a conveyor bed based on the predefined criteria which comprises an indication of a length of the article discharging from a downstream end of the conveyor bed.

Various example embodiments described herein, relates to operating a conveyor bed based on the predefined criteria which comprises an indication of a length of the article entering onto the conveyor bed and a length of an empty space on the conveyor bed.

Various example embodiments described herein, relates to an accumulation conveyor system including a first conveyor bed with a first sensor and a second conveyor bed positioned downstream of the first conveyor bed. The second conveyor bed includes a conveyor frame, a second sensor mounted on the conveyor frame, a pivotable frame pivotably coupled to a downstream end of the conveyor frame, and an actuator positioned at an upstream end of the conveyor frame and attached to the upstream end of the pivotable frame. A first set of rollers coupled to the conveyor frame to transport an article inducted from the first conveyor bed. A second set of rollers mounted to the pivotable frame, positioned below the first set of rollers. A belt is wrapped around the second set of rollers, wherein the belt selectively engages and disengages the first set of rollers by a pivotal movement of the pivotable frame effected by the actuator in response to input signals from the first sensor and the second sensor.

Various example embodiments described herein, relates an accumulation conveyor system, wherein the input signals are indicative of a length of the article on the first conveyor bed or a length of the article on the second conveyor bed.

Various example embodiments described herein, relates an accumulation conveyor system, wherein the first sensor and the second sensor are positioned at pre-determined positions.

Various example embodiments described herein, relates to a method for accumulating articles on a conveyor bed. The method includes steps of receiving a first input signal from a first sensor mounted on a first conveyor bed and a second input signal from a second sensor mounted on a second conveyor bed. Further, processing the first input signal and the second input signal to determine a length of the article on the first conveyor bed and a length of an empty space on the second conveyor bed. After processing, determining whether the length of the article is lesser than or equal to a length of the empty space. As a result of the determination, actuating an actuator to pivot a pivotable frame of the second conveyor bed in order to accumulate the article entering into the second conveyor bed in the empty space when the length of the article is lesser than or equal to the length of the empty space.

Various example embodiments described herein, relates to a method for accumulating articles on a conveyor bed. The method includes moving a belt on the pivotable frame away from the conveyor bed to stop a rotation of first set of rollers on the conveyor bed, wherein the first set of rollers are rotated when the belt is in contact with the first set of rollers.

Various example embodiments described herein, relates to a method for accumulating articles on a conveyor bed, wherein the pivotable frame includes a set of motorized and non-motorized rollers wrapped by the belt.

Various example embodiments described herein, relates to a method for accumulating articles on a conveyor bed. The method includes pivoting the pivotable frame from a first position to a second position, wherein in the first position, an upstream end and a downstream end of the belt is in continuous contact with the conveyor bed driving the first set of rollers of the conveyor bed.

Various example embodiments described herein, relates to a method for accumulating articles on a conveyor bed, wherein in the second position, the upstream end of the belt is not in contact with the conveyor bed and the downstream end is in contact with the conveyor belt, and wherein in the second position, a motion of the belt is stopped by the set of motorized rollers.

Various example embodiments described herein, relates to a method for accumulating articles on a conveyor bed. The method includes stopping the article on the first conveyor bed when the length of the article is greater than or not equal to the length of the empty space.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
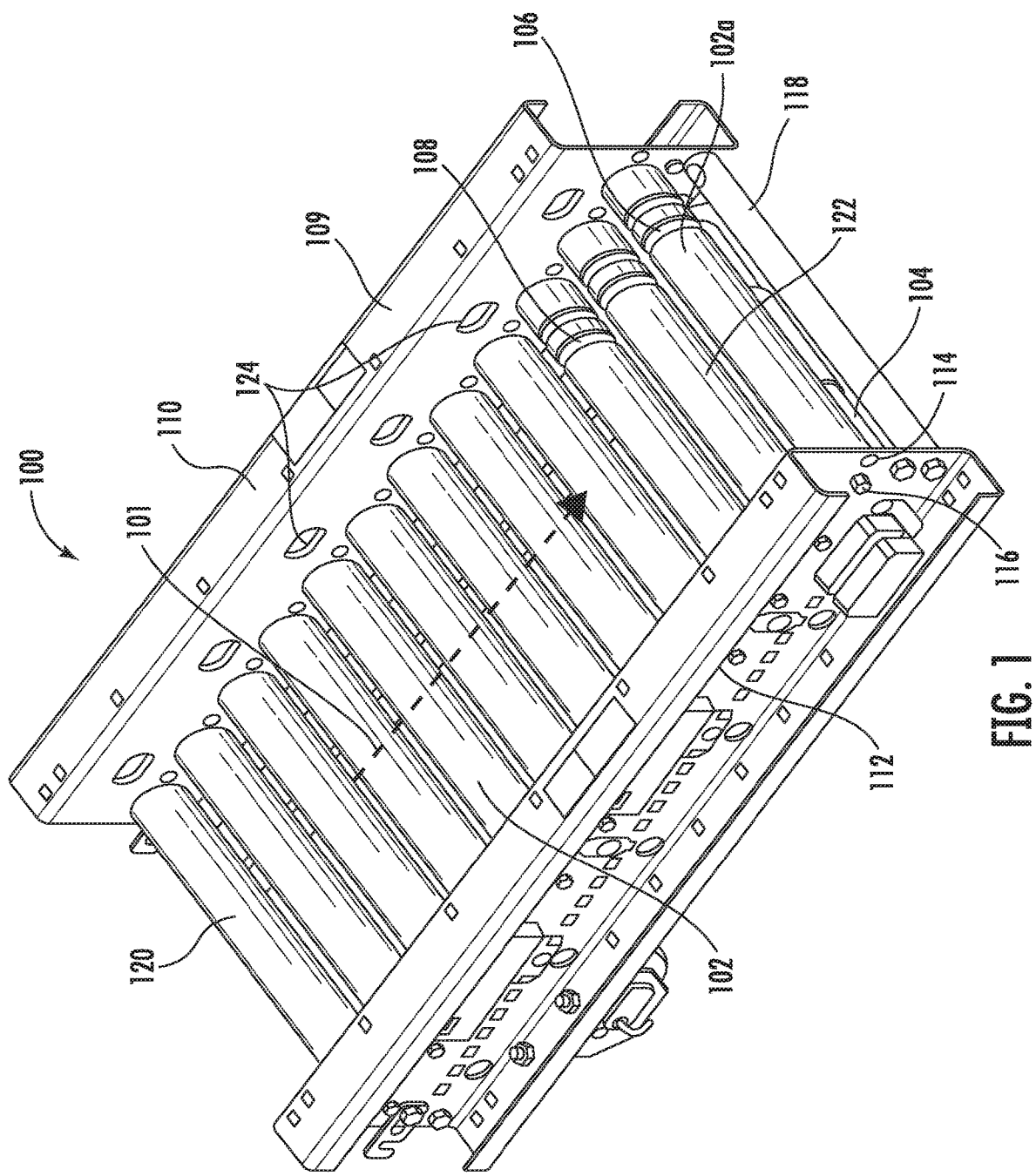
FIG. 1 illustrates a perspective view of a conveyor bed, in accordance with some example embodiments described herein.

Some embodiments of the present disclosure will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. The terms "substantially" and "approximately" are used herein to refer to within engineering and/or manufacturing standards.

As used herein, the terms "conveyor section," "conveyor zone", "conveyor bed," "conveyor assembly/system," and similar terms may be used interchangeably to refer to a conveyor capable of conveying articles within a material handling system in accordance with embodiments of the present disclosure. Thus, use of any such terms should not be taken to limit the spirit and scope of embodiments of the present disclosure.

The components illustrated in the figures represent components that may or may not be present in various embodiments of the invention described herein such that embodiments may include fewer or more components than those shown in the figures while not departing from the scope of the invention.

The word "exemplary," when used herein, is intended to mean "serving as an example, instance, or illustration." Any implementation described herein as "exemplary" is not necessarily preferred or advantageous over other implementations.

The term "downstream direction" is used herein to refer to a transport direction or direction of transport of the articles conveyed on the conveyor bed. In this regard "transport direction" is used herein to refer to a direction of travel of the articles on the conveyor bed from a source to a destination. The term "upstream direction" is used herein to refer to a direction opposite of the transport direction.

The term "upstream end" is used herein to refer an end portion of the conveyor bed in proximity to the upstream direction. The term "downstream end" is used herein to refer an end portion of the conveyor bed in proximity to the downstream direction.

Turning now to the drawings, the detailed description set forth below in connection with the appended drawings is intended as a description of various configurations and is not intended to represent the only configurations in which the concepts described herein may be practiced. The detailed description includes specific details for the purpose of providing a thorough understanding of various concepts with like numerals denote like components throughout the several views. However, it will be apparent to those skilled in the art that these concepts may be practiced without these specific details.

Roller conveyors are commonly found in a variety of a manufacturing, distribution, and warehouse facilities. Roller conveyor systems can include a variety of straight and curved segments configured to allow articles, individually or packaged together, to pass through various locations of the warehouse. An exemplary roller conveyor is an accumulation conveyor configured to accumulate articles on the conveyor system. Typically, the accumulator conveyor is located between upstream and downstream conveyors in a conveyor system. When the production line is operating normally, the accumulator receives the articles from the upstream conveyor and merely transports them therethrough to the downstream conveyor and when there is a production line failure or other jams encountered in the downstream conveyor, the accumulator receives the articles from the upstream conveyor and accumulates the articles until the production line is ready for operating normally.

Many different accumulator conveyor system structures are known in the art. One type of accumulator conveyor system is known as a horizontal accumulator. A typical horizontal accumulator includes a plurality of horizontally spaced, parallel storage paths. One or more entrance gates are provided for directing the flow of articles from the upstream conveyor to one of the storage paths as necessary. In this manner, the flow of articles downstream is temporarily prevented to the downstream conveyor. When it is desired to resume the flow of articles downstream of the horizontal accumulator, one or more exit gates are opened so as to direct the stored articles from the storage paths into the downstream conveyor.

Typically, a zero or non-contact accumulation occurs at each conveyor zone in the accumulator conveyor system. In the zero or non-contact accumulation, one or more articles or products per conveyor zone is accumulated with uniform gaps in between each article in each conveyor zone. These uniform gaps reduce the throughput of the system because they reduce the number of articles that may be handled by each given length of the conveyor zone at any given time. Therefore, there may be a requirement to increase the number of conveyor zones in a conveyor system to handle the articles which in turn adds up to the cost of handing the articles in the warehouse.

Through applied effort, ingenuity, and innovation, many of the above identified problems have been solved by developing solutions that are included in embodiments of the present disclosure, many examples of which are described in detail herein. Various embodiments of the present disclosure relate to a conveyor system which includes a conveyor bed with pivotable frame such that the conveyor bed is capable of forming article slugs on the conveyor bed by reducing gaps between articles. In this regard, article slugs may be formed on each conveyor zones and the length of the conveyor zones at any given time is fully utilized. Further, the conveyor system provide gaps between the article slugs in each zone by selectively pivoting the pivotable frame based on some predefined criteria. These gaps between slugs on the conveyor is determined by a zone length.

In some examples, the predefined criteria include an indication of a length of the article entering onto an upstream end of the conveyor bed. In some examples, the predefined criteria include an indication of an empty space on the conveyor bed. In some examples, the predefined criteria include an indication of a length of the article discharging from a downstream end of the conveyor bed. In some examples, the predefined criteria include an indication of a length of the article entering onto the conveyor bed and a length of an empty space on the conveyor bed.

Thus, the conveyor bed with the pivotable frame facilitates in accumulating articles in each conveyor zone and providing a gap between the article slugs of each conveyor zone. Further, the length of the conveyor zones and the length of the articles entering the conveyor zones and the empty spaces on the conveyor zones are monitored to selectively pivot the pivotable frame to accumulate the articles in each conveyor zone and to provide necessary gap between the article slugs of each conveyor zone.

In the following detailed description of exemplary embodiments of the disclosure, specific representative embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

FIG. 1 illustrates a perspective view of a conveyor bed, in accordance with some example embodiments described herein. The conveyor bed 100 as shown in FIG. 1 illustrates one conveyor section or one conveyor zone from among multiple conveyor sections of a conveyor system. The conveyor bed 100 includes a first set of rollers 102 and a second set of rollers 104 (as shown clearly in FIG. 2). The second set of rollers 104 may be stacked beneath the first set of rollers 102. The second set of rollers 104 may be in a driving engagement with the first set of rollers 102. For example, the first of rollers 102 may be non-motorized rollers and the second set of rollers 104 may include both motorized and non-motorized rollers. The second set of rollers 104 may drive the first set of rollers 102 when the second set of rollers 104 are in contact with the first set of rollers 102. The first set of rollers 102 can be positioned in a direction perpendicular to the direction of travel 101 of articles of the conveyor bed 100. The first set of rollers 102 may include drive bands 106 such as, but not limited to, O-drive bands to drive end idler roller 102a of the first set of rollers 102. In FIG. 1, the end idler roller 102a is connected to neighboring rollers 102b through a series of drive bands 106 in order to drive the end idler roller 102a. Each drive band 106 is wound over a tracking ring 108 provided on the end idler roller 102a and the neighboring roller 102b. The tracking ring 108, for example, can ensure that the drive bands 106 do not slip out of the rollers when the conveyor bed 100 is operating at its full speed. According to an embodiment, the drive bands 106 in the tracking ring 108 may serve to brake the rollers during an accumulation.

Further, the conveyor bed 100 includes a conveyor frame 109 with a first rail 110 and a second rail 112. The first set of rollers 102 can be mechanically coupled between the first rail 110 and the second rail 112. The first rail 110 and the second rail 112 includes a first set of apertures 114 to receive the first set of rollers 102. For example, the first set of apertures 114 are provided with a clearance to accommodate axles 116 (as shown in FIG. 1) of the first set of rollers 102. According to an embodiment, the axles 116 and the first set of apertures 114 may have the same profile. For example, if the axles 116 have hexagonal shaped profile, the first set of apertures 114 may also have the same profile. Alternatively, the axles 116 and the first set of apertures 114 may have different profiles. Further, the first rail 110 and the second rail 112 are coupled together using cross-member support rods 118 provided at an upstream end 120 and a downstream end 122 of the conveyor bed 100. The cross-member support rods 118 are clearly depicted in FIG. 2. Further, the conveyor bed 100 includes one or more sensors 124, for example, photo eye sensors positioned at predetermined distances from each other on the conveyor frame 109.

Figure 2:
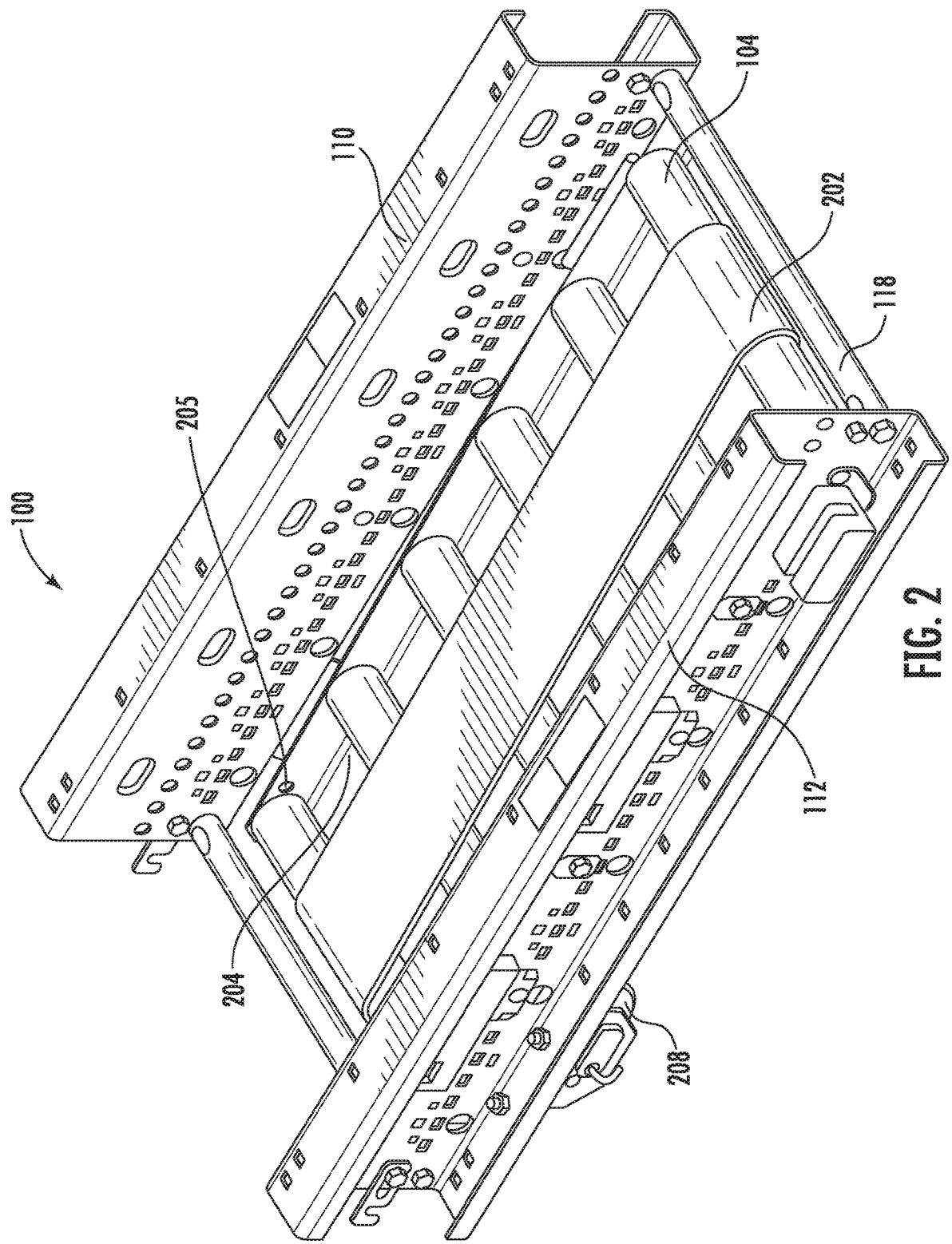
FIG. 2 illustrates a perspective view of the conveyor bed of FIG. 1 with a second set of rollers and a pivotable frame, in accordance with some example embodiments described herein.

FIG. 2 illustrates a perspective view of the conveyor bed of FIG. 1 with the second set of rollers, in accordance with some example embodiments described herein. The second set of rollers 104 are positioned substantially parallel and below the first set of rollers 102. The second set of rollers 104 include motorized and non-motorized rollers. A belt 202 is wrapped around the second set of rollers 104. The motorized rollers of the second set of rollers 104 drives the belt 202. For example, the belt 202 moves in a direction opposite to the direction of travel 101 of the articles in response to the rotary motion of the motorized roller. The belt 202 in turn drives the first set of rollers 102. The first set of rollers 102 are non-motorized rollers that are driven under the influence of the belt 202. The belt 202 drives the first set of rollers 102 to move the articles in the direction of travel 101 from the upstream end 120 of the conveyor bed 100 to the downstream end 122 of the conveyor bed 100.

Figure 3:
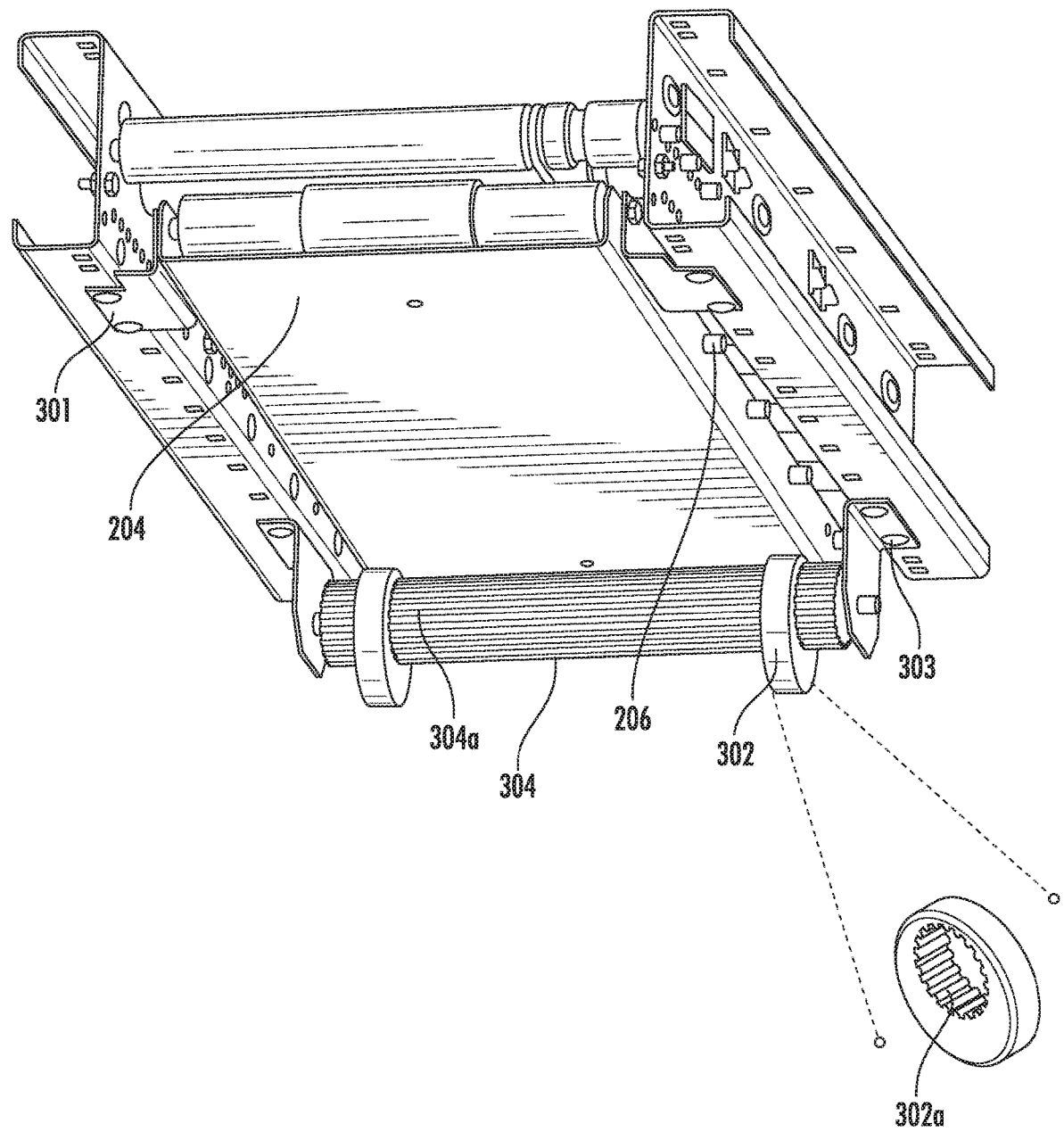
FIG. 3 illustrates a bottom view of the conveyor bed of FIG. 1 with the second set of rollers, the lift cam and the pivotable frame, in accordance with some example embodiments described herein.

The second sect of rollers 104 are mounted to a pivotable frame 204. The pivotable frame 204 includes a second set of apertures 205 to hold axles 206 (as shown in FIG. 3) of the second set of rollers 104. According to an embodiment, the axles 206 and the second set of apertures 205 may have the same profile. For example, if the axles 206 have hexagonal shaped profile, the second set of apertures 205 may also have the same profile. Alternatively, the axles 206 and the second set of apertures 205 may have different profiles. The pivotable frame 204 is pivotably coupled at one end, for example, at the downstream end 122 of the conveyor bed 100 as shown in FIG. 3. A bottom view of the conveyor bed 100 of FIG. 1 is shown in FIG. 3. The pivotable frame 204 is coupled at the bottom of the first rail 110 and the second rail 112 using suitable fasteners 301 (as shown in FIG. 3). The fasteners 301, for example, may be nuts and bolts, L-clamps, pivot pins and the like that is configured to pivotably couple one end of the pivotable frame 204 to the conveyor bed 100. Further, the pivotable frame 204 is operated by an actuator 208 positioned beneath the pivotable frame 204. The actuator 208 is coupled to one end of the pivotable frame 204, for example, at an upstream end 120 of the conveyor bed 100 opposite to the downstream end 122. For example, the pivotable frame 204 is coupled to the conveyor bed 100 at the upstream end 120 of the conveyor bed 100 and the actuator 208 is coupled to pivotable frame 204 at the downstream end 122 of the conveyor bed 100. The actuator 208 may be one of an electric actuator or a pneumatic actuator. The actuator 208 is coupled at the bottom of the first rail 110 and the second rail 112 using suitable fasteners 303 (as shown in FIG. 3). The fasteners 303, for example, may be nuts and bolts, L-clamps, pivot pins and the like. In FIG. 3, the actuator 208 is in the form of an electric actuator with a pair of spaced apart lift cams 302 operated by a roller 304. The roller 304, for example, may be a motorized drive roller. The pivotable frame 204 is pivoted by rotation of the lift cams 302. The pair of spaced apart lift cams 302 are carried by the roller 304, rotating therewith. The roller 304 can be a motorized drive roller. Cam tracks of the lift cams 302 may be identical to and rotationally aligned with each other. For example, each lift cam 302 may include cam tracks with an eccentric profile. The cam tracks of both the lift cams 302 can have mirror image symmetry. In the depicted embodiment, the roller 304 can include an extruded sleeve 304a with teeth 304b to engage the lift cams 302. In some examples, the lift cams 302 may include some toothed slots 302a (as shown in breakout view in FIG. 3) to fix to the extruded sleeve 304a of the roller 304. The roller 304 may be controlled to rotate in either direction through a total rotational angle consistent with the configuration of lift cams 302, in some examples, less than 360° of total rotation. In some examples, zero degrees may represent the position of the lift cams 302 when the pivotable frame 204 is in contact with the conveyor bed 100 and at less than −180° of rotation from the 0° position, the pivotable frame 204 may be out of contact with the conveyor bed 100.

Figure 4:
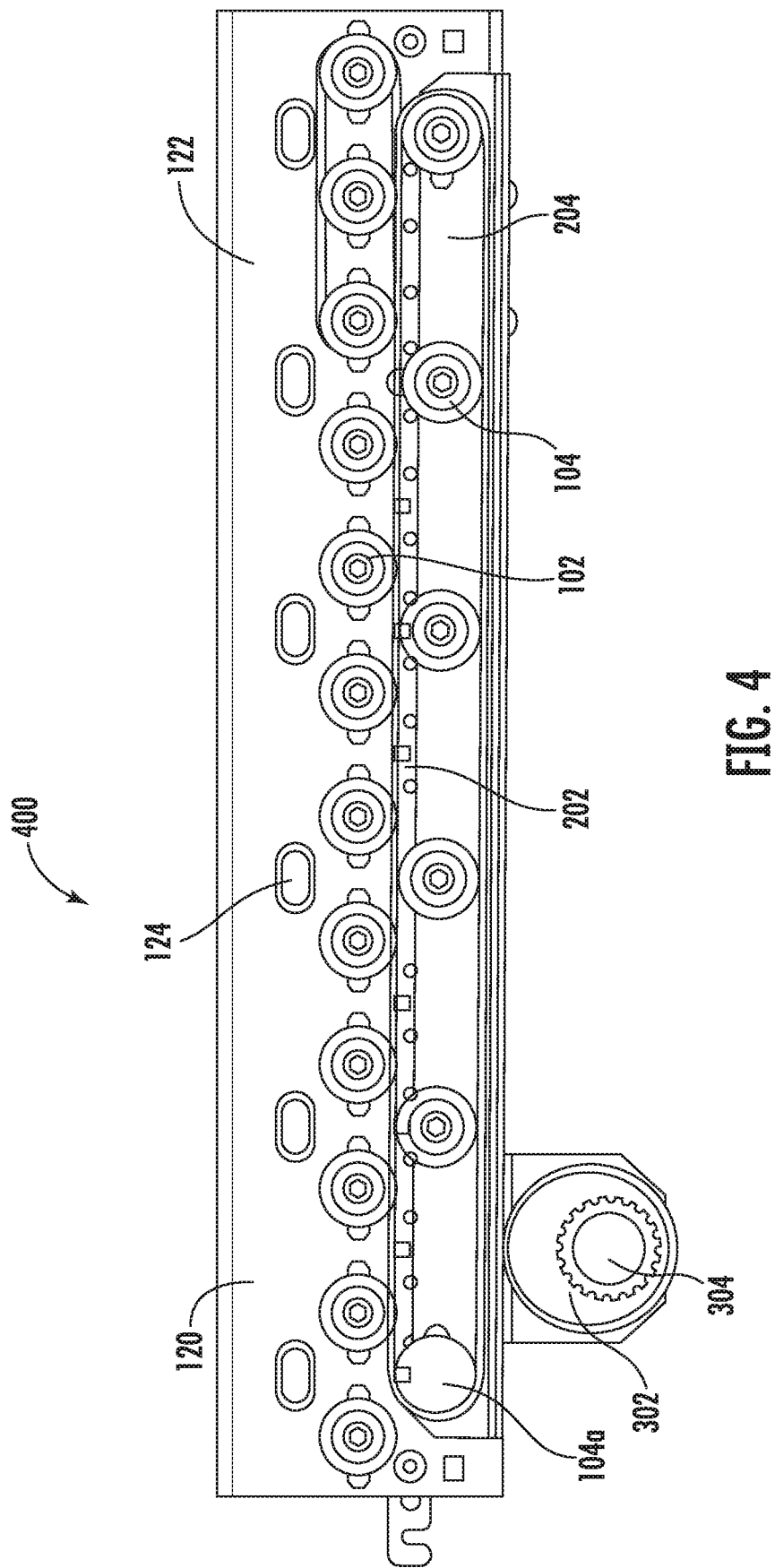
FIG. 4 illustrates a cross-sectional side view of the conveyor bed of FIG. 1 with the pivotable frame in a first position, in accordance with some example embodiments described herein.
Figure 5:
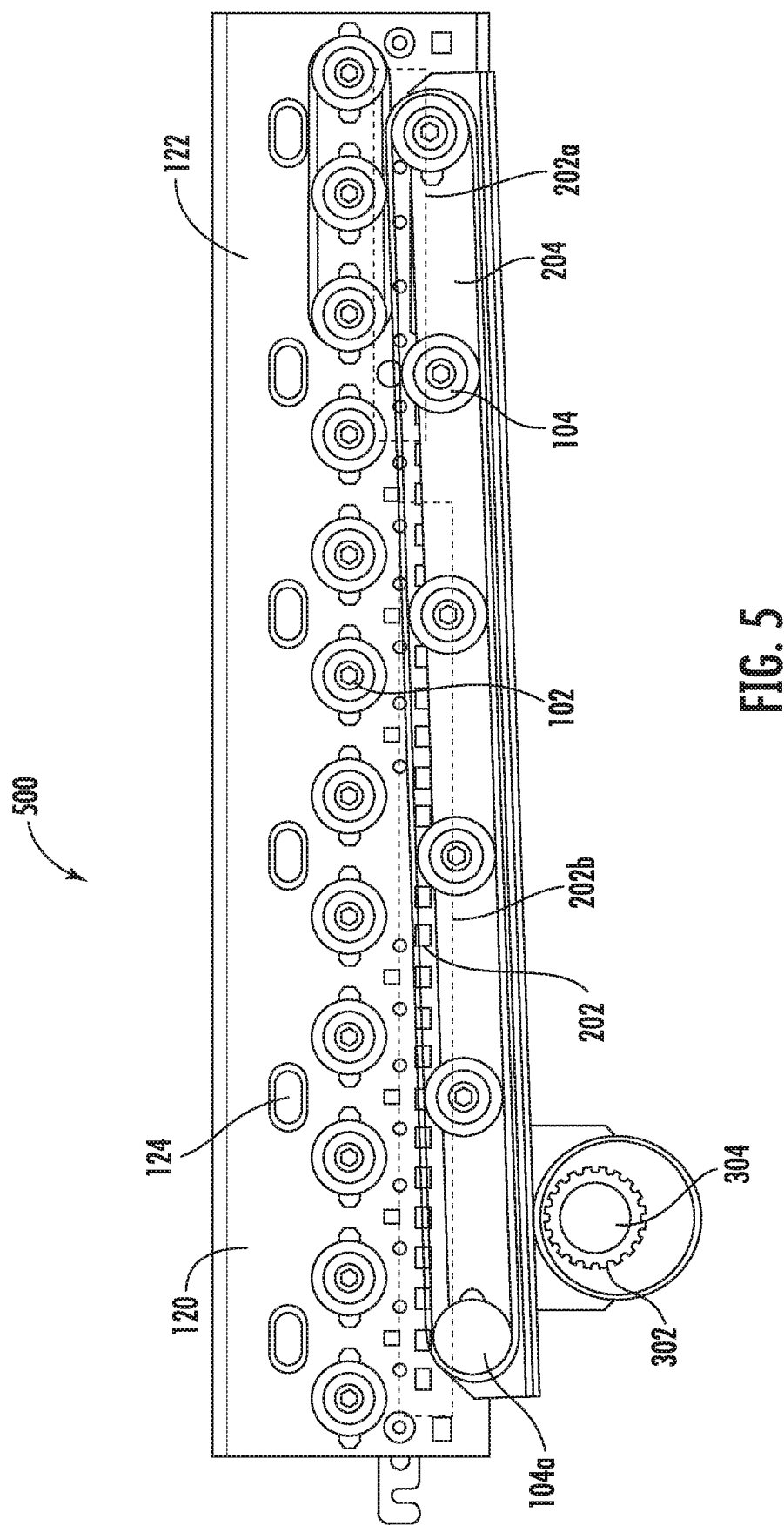
FIG. 5 illustrates a cross-sectional side view of the conveyor bed of FIG. 1 with the pivotable frame in a second position, in accordance with some example embodiments described herein.

The pivotable frame 204 is pivoted under the influence of the lift cams 302 as shown in FIG. 3 from a first position 400 as shown in FIG. 4 to a second position 500 as shown in FIG. 5 and vice versa. The first position 400 may be a home position and the second position 500 may be a work position. FIG. 4 illustrates a cross-sectional side view of the conveyor bed of FIG. 1 with the pivotable frame 204 in the first position 400, in accordance with some example embodiments described herein. The first position 400, for example, may be the home position of the pivotable frame 204. At the first position 400, the belt 202 wrapped around the second set of rollers 104 engages with the first set of rollers 102 to drive the articles on the first set of rollers 102 in a transportation direction 101. At the first position 400, the lift cams 302 are rotated such that the pivotable frame 204 may be aligned in parallel with the conveyor bed 100 with the belt 202 engaging the first set of rollers 102. For example, at the first position 400, the toothed slots 302a of the lift cams 302 engaging the roller 304 may be in the bottom position of the eccentric profile of the lift cams 302.

When a controller of the conveyor bed 100 receives an input signal from one or more sensors 124 mounted on the conveyor bed 100, the controller may operate the roller 304 of the lift cam 302 to rotate such that the pivotable frame 204 is pivoted from the first position 400 to the second position 500 as shown in FIG. 5. FIG. 5 illustrates a cross-sectional side view of the conveyor bed of FIG. 1 with the pivotable frame 204 in the second position 500 or the work position, in accordance with some example embodiments described herein. The second position 500, for example, may be the work position of the pivotable frame 204. In the second position 500, the lift cams 302 are rotated such that one portion 202a of the belt 202 may be still engaged to the first set of rollers 102 at the downstream end 122 of the conveyor bed 100 and other portions 202b of the belt 202 are disengaged from the first set of rollers 102 at the upstream end 120 of the conveyor bed 100. In the second position 500, due to the rotation of the lift cams 302, the pivotable frame 204 is lowered and the articles arriving at the upstream end 120 of the conveyor bed 100 may coast against each other to form a slug as the driving force to drive the articles is withdrawn from the first set of rollers 102 by moving the other portions 202*b* of the belt 202 away from the first set of rollers 102. For example, in the second position, the toothed slots 302*a* of the lift cam 302 may be engaging the roller 304 is in the top position of the eccentric profile of the lift cam 302. In the second position 500, a motorized drive roller 104*a* of the second set of rollers 104 may stop rotation to stop the motion of the articles at the downstream end 122 of the conveyor bed 100. In the second position 500, one portion 202*a* of the belt 202 which is still engaged to the first set of rollers 102 at the downstream end 122 may acts as a brake to stop the movement of the articles at the downstream end 122 as the belt 202 is no longer driven by the motorized drive roller 104*a*. Therefore, the belt 202 may remain stationary and engaged with the downstream rollers of the first set of rollers 102 to prevent the articles being released to the neighboring downstream zones. In this manner, the articles may be coasted from the upstream end 120 to the downstream end 122 and accumulated as an article slug on the conveyor bed 100.

Figure 6:
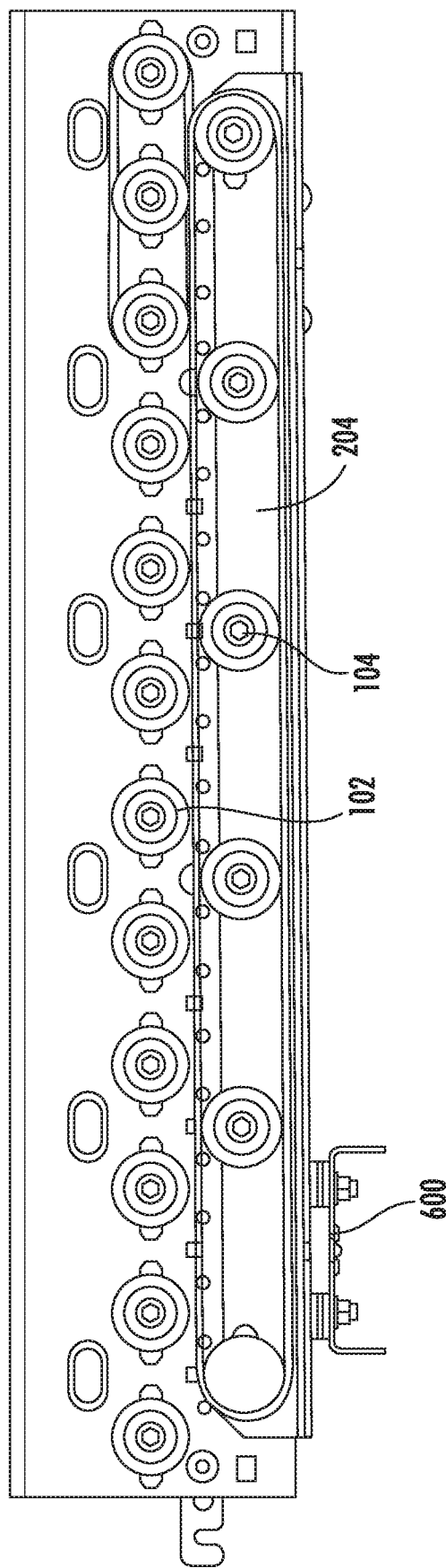
FIG. 6 illustrates a cross-sectional side view of the conveyor bed of FIG. 1 with a pneumatic actuator, in accordance with some example embodiments described herein.

The pivotable frame 204 can also be transformed from the first position 400 to the second position 500 using pneumatic actuators, such as, but not limited to, bellow actuators 600 operated under the influence of air pressure as shown in FIG. 6. For example, the bellows may be inflated with air supply at a particular pressure to retain the pivotable frame 204 in the first position 400. When the pivotable frame 204 is ready to be transformed to the second position 500, the bellows may be deflated by removing the air supply and thus lowering the pivotable frame 204 from the first position 400 to the second position 500 and out of contact with the first set of rollers 102.

Figure 7:
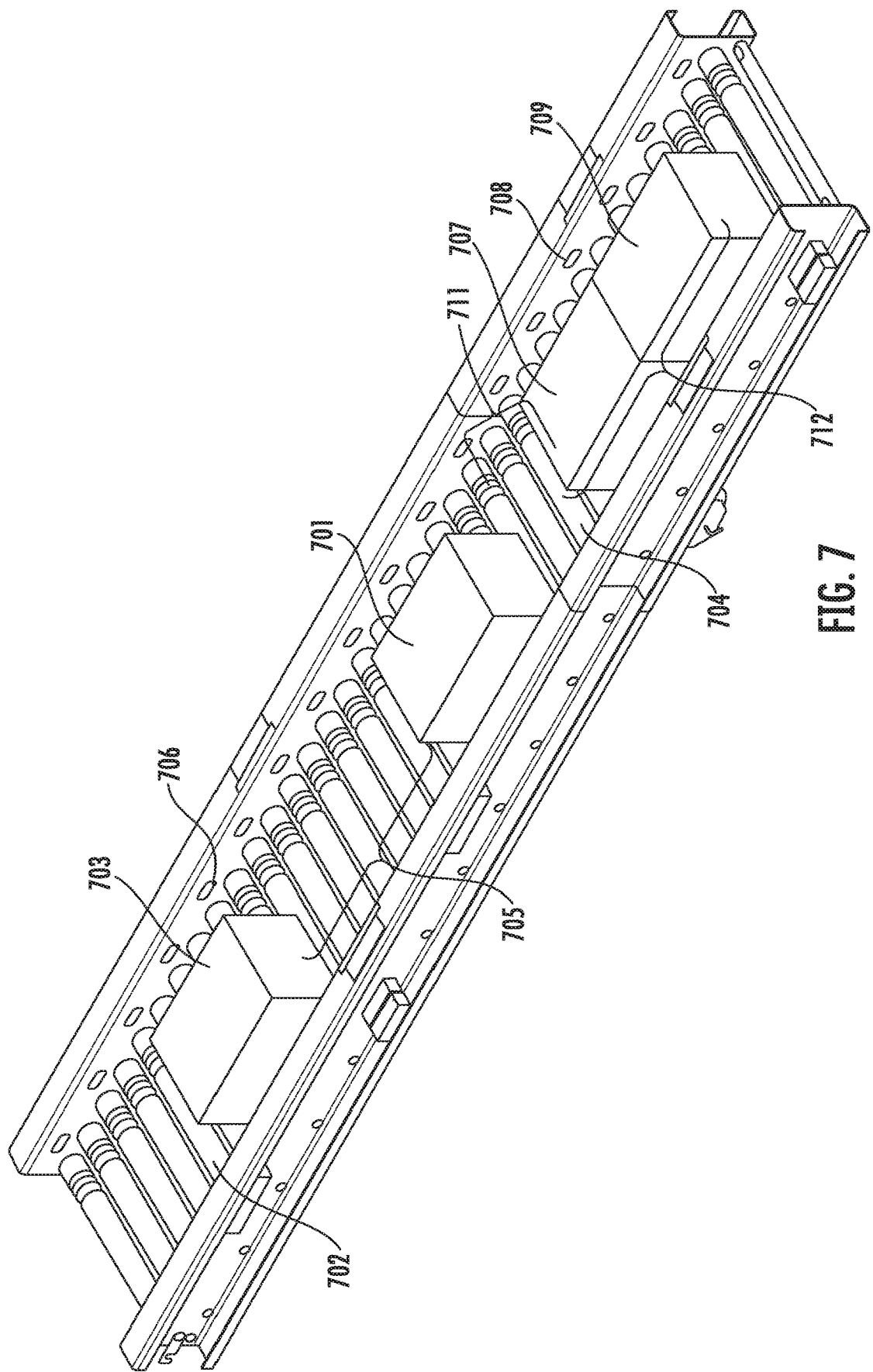
FIG. 7 illustrates a perspective view of a first conveyor bed and a second conveyor bed as shown in FIG. 1 with items moving downstream from the first conveyor bed to the second conveyor bed, in accordance with some example embodiments described herein.

FIG. 7 illustrates a perspective view of a conveyor system with a first conveyor bed and a second conveyor with articles moving downstream from the first conveyor bed to the second conveyor bed, in accordance with some example embodiments described herein. The first conveyor bed 702 may be a normal conveyor bed with one set of rollers used for transporting articles. The second conveyor bed 704 is the conveyor bed 100 as shown in FIG. 1. The conveyor system 700 depicted in FIG. 7 may be an accumulator conveyor system in which accumulation of articles occur on each zone of the conveyor system. The first conveyor bed or conveyor zone 702 may be positioned upstream of the second conveyor bed or conveyor zone 704. In FIG. 7, the first conveyor bed 702 has two articles 701, 703 which are moving towards the second conveyor bed 704 with gaps 705 in between them. For example, the first conveyor bed 702 may include two zones with one article in each zone. The second conveyor bed 704, for example is a crowded zone which has two more articles 707, 709 accumulated on the second conveyor bed 704 with no gaps in between them, thus forming a slug. The articles 701, 703, 707, 709 in the depicted embodiment may be a box or carton, however, other type of articles such as polybags may also be handled by the conveyor system 700. In the conveyor system shown in FIG. 7, the articles may be accumulated in the second conveyor bed 702 based on some predefined criteria. For example, components, such as the pivotable frame 204, the belt 202 and the motorized rollers of second conveyor bed 702 as discussed previously are controlled based on the predefined criteria.

In some examples, the predefined criteria may include an indication of a length of the article 701 entering onto an upstream end of the second conveyor bed 704. In some examples, the predefined criteria may include an indication of an empty space 711 on the second conveyor bed 704. In some examples, the predefined criteria may include an indication of a length of the article 707 or 709 or article slug 712 discharging from a downstream end of the second conveyor bed 704. In some examples, the predefined criteria may include an indication of a length of the article 701 entering onto the second conveyor bed and a length of the empty space 711 on the second conveyor bed.

The conveyor system 700 may include one or more article detectors 124 positioned on each conveyor zone 702, 704 to monitor the articles 701, 703, 707, 709 travelling past each conveyor zone 702, 704. The article detectors 124 may preferably be photo eye sensors which produces a beam directed across the conveyor bed at an opposing light source or reflector such that when the articles 701, 703, 707, 709 moving on the conveyor bed passes the article detectors, the beam is broken indicating the presence of an article 701, 703, 707, 709. The article detectors 124 may be adapted to detect a leading edge of the article and generate a leading-edge signal. According to an embodiment, the article detectors 124 may also act as a trailing-edge sensor to detect the trailing edge of the article since after the article passes beyond the article detector 124, the interruption of the beam is ended allowing the trailing edge position of the article to be determined. Thereby, the article detector 124 may be adapted to generate a trailing-edge signal. While in the embodiment, the photo eye sensor may be utilized as the article detector 124, it will be recognized by those skilled in the art from the present disclosure that other types of sensors may be utilized to detect the leading and/or trailing edges of the articles 701, 703, 707, 709 traveling along the conveyor bed, such as an image sensor or any other suitable detector arrangement.

In some examples, the image sensor (not shown) may be provided along with the article detector to capture images of the articles 701, 703, 707, 709. A processor may be provided in communication with the article detector 124 and the image sensor. The processor may receive the leading-edge signal, trailing-edge signal, and the captured images to calculate an approximate object size, dimension or shape of the article. Preferably, the processor may include an analog to digital convertor to convert the signal from the image sensor which is then transmitted to the logic board along with the leading-edge signal and the trailing-edge signal. The logic board may include a CPU which is programmed to carry out the calculation of the article dimensions. The article dimensions may include either the length, width, height, or their combination. After the approximate article dimensions are calculated, they are outputted from the processor via an output path wired or wirelessly to a conveyor controller to control an operation of the conveyor system, for example, controlling a movement of the pivotable frame 204 of the conveyor bed 704.

In some examples, the empty space 711 on the second conveyor bed 704 may be calculated by the processor after receiving the leading-edge signal, trailing-edge signal, and the captured images. The empty space 711, for example, may be unoccupied space of the second conveyor bed 704 after the articles 707, 709 have been accumulated. In this regard, a length of each conveyor bed or zone may be predefined and stored in the memory. The processor may calculate the empty space using a cumulative length of the articles accumulated on the conveyor bed and the known length of the conveyor bed stored in the memory. In some examples, images of the conveyor bed may be captured and transmitted to processor. The processor may then mask the occupied areas and provide an image of the empty space of the conveyor bed.

In order to accumulate the articles in the second conveyor bed 704 (as shown in FIG. 7) by pivoting the pivotable frame 204 with the second set of roller 104 of the second conveyor bed 704, the conveyor controller may be aware of the parameters such as dimension of the article 701 arriving at the second conveyor bed 704 from the first conveyor bed 702, the empty space 711 on the second conveyor bed 704, and a cumulative length of the articles 707, 709 or the length of the article slug currently positioned on the second conveyor bed 704. As seen In FIG. 7, a first set of article detectors 706 may be provided on the first conveyor bed 702 and a second set of article detectors 708 may be provided on the second conveyor bed 704 which enable the processor to calculate these parameters. As discussed previously, the first set of article detectors 706 may sense the leading-edge and the trailing-edge of the article 701 yet to be transported to the second conveyor bed 704 and may generate the leading-edge signal and the trailing-edge signal which is transmitted to the processor. The processor after receiving the leading-edge signal and trailing-edge signal may calculate the length of the article 701 yet to be transported to the second conveyor bed 704. Meanwhile, the second set of article detectors 708 on the second conveyor bed 704 may transmit another set of leading-edge signal and the trailing-edge signal to the processor of the articles 707, 709 accumulated in the second conveyor bed 704. The processor may calculate the cumulative length of the articles 707, 709 in response to receiving the set of leading-edge signal and the trailing-edge signal. Further, the processor may determine a length of the empty space 711 using the known length of the second conveyor bed 704 and the calculated cumulative length of the articles 707, 709.

If this determined length of the empty space 711 is greater than or equal to the length of the article 701 yet to be transported to the second conveyor bed 704, then the processor may transmit an input signal to the conveyor controller to pivot the pivotable frame 204 of the second conveyor bed 704 from the first position 400 to the second position 500 as shown in FIGS. 4 and 5 in order to coast the article 701 in the empty space 711 of the second conveyor bed 704 thus creating an article slug of length equal to the length of the second conveyor bed 704. In some examples, images of the second conveyor bed 704 may be captured and transmitted to processor. The processor may then mask the occupied areas and provide an image of the empty space 711 of the second conveyor bed 704. The processor may then compare the image of the empty space 711 with the images of the articles 701, 703 on the first conveyor bed 702. As a result of comparison, if it is determined that the length of the empty space 711 is greater than or equal to the length of the article 701 yet to be transported to the second conveyor bed 704, then the processor may transmit an input signal to the conveyor controller to pivot the pivotable frame 204 in order to coast the article 701 in the empty space 711 of the second conveyor bed 704. In this manner, given length of the conveyor zone or bed at any given time is fully utilized, thereby reducing the need for installation of additional conveyor beds in the conveyor system to accommodate the articles. Further, the gaps 705 between the articles 701, 703 provided in the first conveyor bed 702 during accumulation leads to unused space in the first conveyor bed 702 which may then reduced by creating article slugs 712 with no gaps in the second conveyor bed 704, thereby increasing the throughput of the conveyor system. It is also noted that a gap 705 is provided between the articles 701, 703 on the first conveyor bed 702 and the article slugs 712 on the second conveyor bed 704 such that the articles 701, 703 on the first conveyor bed 702 can enter the second conveyor bed 704 after the article slug 712 accumulated on the second conveyor bed 704 is released to a neighboring downstream conveyor bed. In this manner, articles in a particular conveyor zone may be accumulated with zero gap in between them and a minimum gap is introduced between the articles of two neighboring zones.

Therefore, continuously monitoring the length of the articles 701, 703, 707, 709 and the empty space 711 on the conveyor beds may enable the pivotable frame 204 to be selectively pivoted for accumulating articles. Further, lowering down the pivotable frame 204 out of contact with the second conveyor bed 704 may enable the articles 701, 703 entering the second conveyor bed 704 to coast to a stop and results in article slugs 712. When the pivotable frame 204 is lowered to the work position, the motorized drive roller (MDR) roller 104*a* (as shown in FIG. 5) on the pivotable frame 204 may be switched to an OFF state which stops the rotation of the belt 202 and thereby the belt 202 stops driving the rollers of the second conveyor bed 704. When the MDR roller 104*a* is in the OFF state, the belt 202 may be in the non-driven state. When the accumulated articles 707, 709 are to be released to the neighboring downstream conveyor bed, the pivotable frame 204 may be raised up to make contact with the rollers of the second conveyor bed to enable the article slug 712 to be released to the neighboring downstream conveyor bed. When the pivotable frame 204 is raised to the home position, the MDR roller 104*a* on the pivotable frame 204 may be switched to an ON state which starts the rotation of the belt 202 and thereby the belt 202 starts driving the rollers of the second conveyor bed 704. When the MDR roller 104*a* is in the ON state, the belt 202 may be in the driven state.

Figure 8:
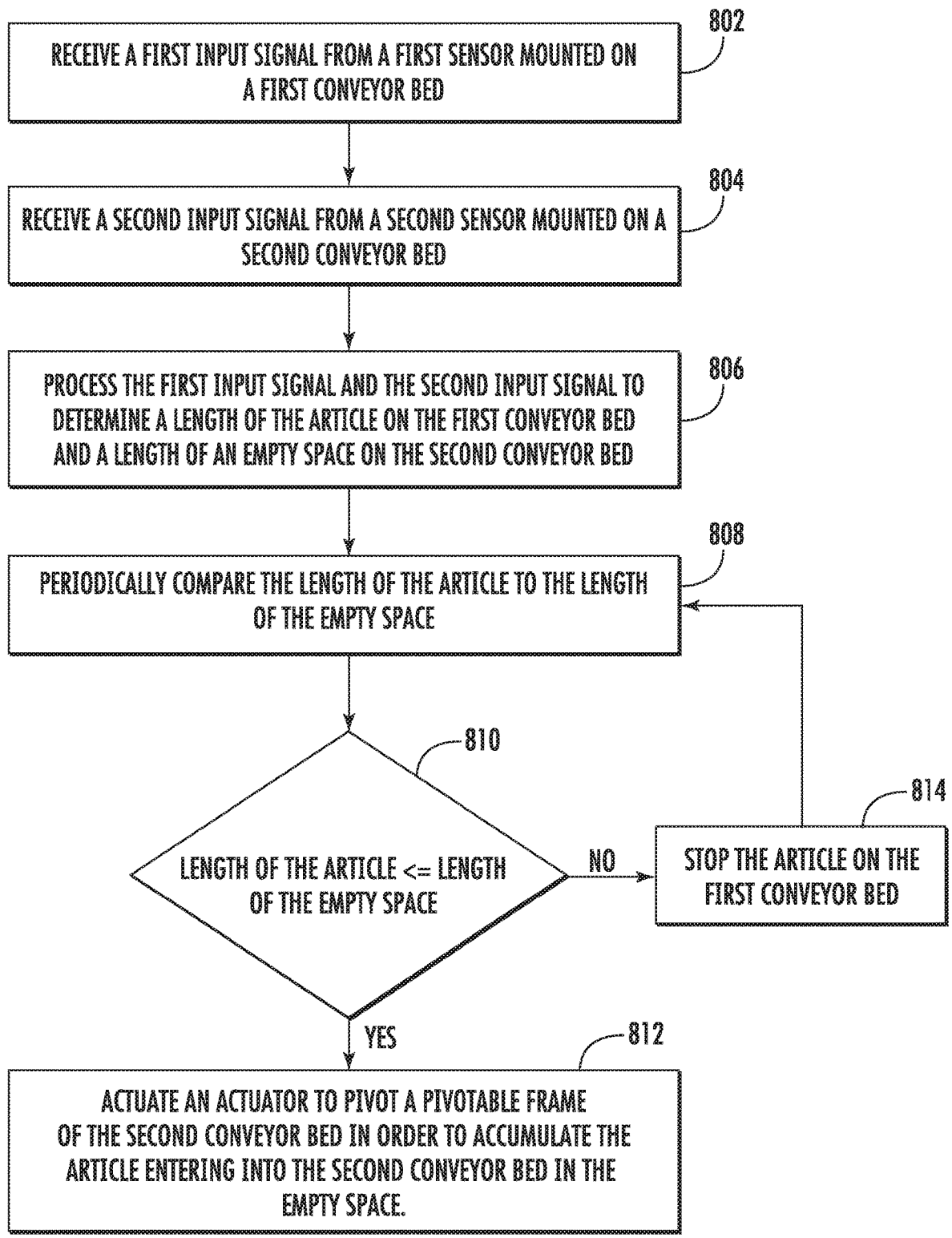
FIG. 8 illustrates a flowchart of a method of accumulating items on the conveyor bed of FIG. 1, in accordance with some example embodiments described herein.

FIG. 8 illustrates a flowchart of a method of accumulating items on the conveyor bed of FIG. 1, in accordance with some example embodiments described herein. According to an embodiment, the conveyor bed may include sensors positioned at pre-determined positions throughout a length of the conveyor bed equidistant from each other. The sensors may provide one or more input signals to a conveyor controller or a processor. In some example, the sensors may be communicably coupled with the processor and the processor may process the input signals provided by the sensors. After processing the input signals, the processor may provide command signals to the conveyor controller. The command signals, for example, may be binary digital signals (i.e., binary high signal 1 and binary low signal 0). In response to the command signals, the conveyor controller may operate the conveyor bed of FIG. 1. In some examples, the controller may be capable of receiving the input signals from the sensors, processing the input signals, and determining the operations to be performed on the conveyor bed of FIG. 1. At step 802, the controller may receive a first input signal from a first sensor mounted on a first conveyor bed. In some examples, the first sensor may be a photo eye sensor or an image sensor. In some examples, the image sensor may capture images of the conveyor bed with articles and without articles and transmit the input signals to the processor. The processor using the captured images may determine the empty space of the conveyor bed and the length of the articles on the conveyor bed. The processor may relay the determined information as an inputs signal to the controller or it may process the input signal to determine the operations to be performed on the conveyor bed. In some examples, the photo eye sensor may provide the inputs signal to the controller by detecting a leading edge of the article and a trailing edge of the article to determine the length of the article. The photo eye sensor may record the length of all the articles entering the conveyor bed and transmit a cumulative length of the articles entering the conveyor bed. In some examples, photo eye sensor may record the length of all the articles entering the conveyor bed and transmit the length to the processor which in turn may determine the cumulative length of the articles. At step 804, the controller may receive a second input signal from a second sensor mounted on a first conveyor bed. In some examples, the second sensor may be a photo eye sensor or an image sensor. The second sensor may provide like information as that of the first sensor as discussed previously. The controller or the processor, after receiving the first input signal and the second input signal, may process the input signals and may determine a length of the article on the first conveyor bed and a length of an empty space on the second conveyor bed at step 806. The processing of the input signals may involve calculating the empty space by using the cumulative length of the articles on the second conveyor and the known length of the second conveyor bed. The known length may be the actual length of the second conveyor bed predefined in a memory and used by the processor during the processing of the input signals. At step 808, the controller or the processor may periodically compare the length of the article to the length of the empty space. The comparison is to ensure that whether the second conveyor bed has enough space to accommodate the articles from the first conveyor bed. At step 810, as a result of the comparison, if the length of the article is lesser than or equal to length of the empty space, then at step 812, the controller or the processor may actuate an actuator to pivot a pivotable frame of the second conveyor bed in order to accumulate the article entering into the second conveyor bed in the empty space. The pivotable frame as discussed previously may include an electric or a pneumatic actuator which is activated by the controller or the processor. As a result of activation, the pivotable frame may be lowered out of contact with the second conveyor bed, stopping the rotation of rollers of the second conveyor bed and enabling the article entering the second conveyor bed to coast to stop in the empty space on the second conveyor bed. In this manner, article slugs may be formed on the second conveyor bed. For example, a belt provided on the pivotable frame for driving the rollers may be moved away from the second conveyor bed to stop a rotation of the rollers. Further, at step 810, as a result of the comparison, if the length of the article is greater than or not equal to length of the empty space, then at step 814, the controller or the processor may stop the article in the first conveyor bed. In this scenario, the article may not enter the second conveyor bed and does not coast to stop on the empty space.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a non-transitory processor-readable, computer-readable, or server-readable medium or a non-transitory processor-readable storage medium. The steps of a method or algorithm disclosed herein may be embodied in a processor-executable software module or processor-executable software instructions which may reside on a non-transitory computer-readable storage medium, a non-transitory server-readable storage medium, and/or a non-transitory processor-readable storage medium. In various embodiments, such instructions may be stored processor-executable instructions or stored processor-executable software instructions. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory processor-readable storage medium and/or computer-readable medium, which may be incorporated into a computer program product.

The foregoing description of an embodiment has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. Although only a limited number of embodiments of the invention are explained in detail, it is to be understood that the invention is not limited in its scope to the details of construction and arrangement of components set forth in the preceding description or illustrated in the drawings. The invention is capable of other embodiments and of being practiced or carried out in various ways. Also, in describing the embodiment, specific terminology was used for the sake of clarity. It is to be understood that each specific term includes all technical equivalents which operate in a similar manner to accomplish a similar purpose.

The invention claimed is:

1. A conveyor bed, comprising:
a conveyor frame;
a first set of rollers coupled to the conveyor frame to transport an article from an upstream location to a downstream location;
a pivotable frame pivotably coupled to a downstream end of the of the conveyor frame;
a second set of rollers mounted to the pivotable frame, positioned below the first set of rollers; and
a belt wrapped around the second set of rollers, wherein a portion of the belt at an upstream end disengages and a portion of the belt at the downstream end remains engaged with at least one roller of the first set of rollers in response to rotating the pivotable frame away from the upstream end and about the downstream end based on predefined criteria.

2. The conveyor bed of claim 1, further comprises:
an actuator coupled to the pivotable frame at the upstream end of the conveyor bed to pivot the pivotable frame, wherein the actuator is one of an electric actuator or a pneumatic actuator.

3. The conveyor bed of claim 1, wherein a roller of the second set of rollers is a motorized drive roller (MDR).

4. The conveyor bed of claim 1, wherein a roller of the first set of rollers is an idler roller.

5. The conveyor bed of claim 1, wherein the belt drives the first set of rollers when the portion of the belt at the upstream end and the portion of the belt at the downstream end is engaged with the first set of rollers, wherein the belt is in a driven state when the pivotable frame is in a home position.

6. The conveyor bed of claim 1, wherein when the portion of the belt at the upstream end is disengaged in response to the rotating the pivotable frame downwards to a work position, a portion of the belt at a pivoting end of the pivotable frame is in contact with the first set of rollers to retard a rotation of a downstream roller of the first set of rollers, and wherein the belt is in a non-driven state in the work position.

7. The conveyor bed of claim 6, wherein the article coasts to a stop when the belt is in the work position.

8. The conveyor bed of claim 1, wherein the predefined criteria comprises an indication of a length of the article entering onto an upstream end of the conveyor bed.

9. The conveyor bed of claim 1, wherein the predefined criteria comprises an indication of an empty space on the conveyor bed.

10. The conveyor bed of claim 1, wherein the predefined criteria comprises an indication of a length of the article discharging from a downstream end of the conveyor bed.

11. The conveyor bed of claim 1, wherein the predefined criteria comprises an indication of a length of the article entering onto the conveyor bed and a length of an empty space on the conveyor bed.

12. An accumulation conveyor system comprising:
a first conveyor bed with a first sensor; and
a second conveyor bed positioned downstream of the first conveyor bed, wherein the second conveyor bed comprises:
a conveyor frame;
a second sensor mounted on the conveyor frame;
a pivotable frame pivotably coupled to a downstream end of the conveyor frame;
an actuator positioned at an upstream end of the conveyor frame and attached to the upstream end of the pivotable frame;
a first set of rollers coupled to the conveyor frame to transport an article inducted from the first conveyor bed;
a second set of rollers mounted to the pivotable frame, positioned below the first set of rollers; and
a belt wrapped around the second set of rollers, wherein a portion of the belt at the upstream end disengages and a portion of the belt at the downstream end remains engaged with at least one roller of the first set of rollers in response to a rotational movement of the pivotable frame away from the upstream end and about the downstream end effected by the actuator in response to input signals from the first sensor and the second sensor.

13. The accumulation conveyor system of claim 12, wherein the input signals are indicative of a length of the article on the first conveyor bed or a length of the article on the second conveyor bed.

14. The accumulation conveyor system of claim 12, wherein the first sensor and the second sensor are positioned at pre-determined positions.

15. A method for accumulating articles on a conveyor bed comprises:
receiving a first input signal from a first sensor mounted on a first conveyor bed;
receiving a second input signal from a second sensor mounted on a second conveyor bed;
processing the first input signal and the second input signal to determine a length of the article on the first conveyor bed and a length of an empty space on the second conveyor bed;
determining whether the length of the article is lesser than or equal to a length of the empty space; and
actuating an actuator to pivot a pivotable frame of the second conveyor bed in order to accumulate the article entering into the second conveyor bed in the empty space when the length of the article is lesser than or equal to the length of the empty space.

16. The method of claim 15, wherein the actuating further comprises:
moving a belt on the pivotable frame away from the conveyor bed to stop a rotation of first set of rollers on the conveyor bed, wherein the first set of rollers are rotated when the belt is in contact with the first set of rollers.

17. The method of claim 15, wherein the actuating further comprises:
pivoting the pivotable frame from a first position to a second position, wherein in the first position, an upstream end and a downstream end of the belt is in continuous contact with the conveyor bed driving the first set of rollers of the conveyor bed.

18. The method of claim 16, further comprises:
stopping the article on the first conveyor bed when the length of the article is greater than or not equal to the length of the empty space.

* * * * *